Figure 1:
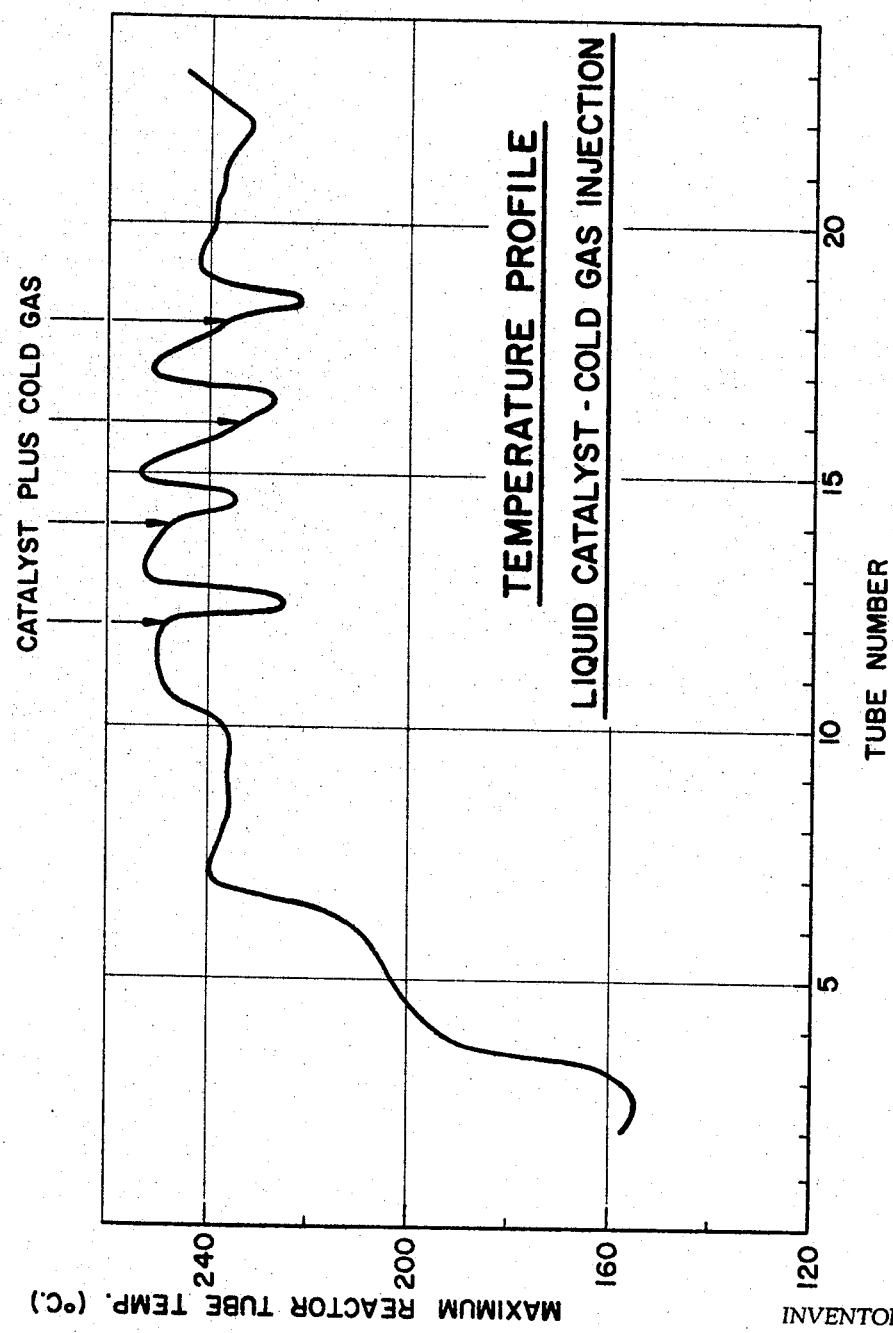

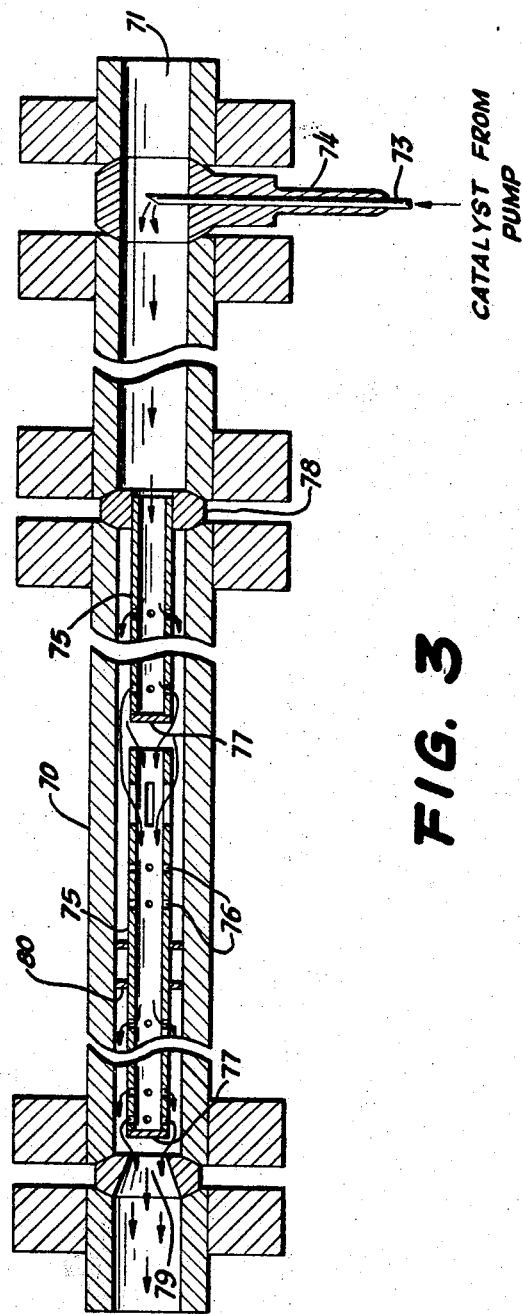

3,405,115
LIQUID CATALYST INJECTION
Hans M. Schappert, Bethel Park, and Archie Hill, Pittsburgh, Pa., assignors to Koppers Company, Inc., a corporation of Delaware
Filed Feb. 26, 1964, Ser. No. 347,585
7 Claims. (Cl. 260—94.9)

This invention relates to an improved process for polymerizing ethylene under high temperatures and pressures.

It is well known that liquid to solid polymers of ethylene can be prepared by heating ethylene under controlled temperatures and pressures in the presence of catalytic amounts of free-radical yielding catalysts, such as oxygen or organic compounds that decompose at or below the polymerization temperature to generate free radicals. Typical of these organic initiators are peroxides, hydroperoxides, azo compounds and the like. If the organic catalysts are used in the polymerization, it is desirable to employ a liquid catalyst system; e.g., a system in which an inert organic liquid reaction medium, such as benzene, is used to carry the catalyst into the reactor.

In carrying out the polymerization of ethylene under high pressures, ethylene is conveniently introduced into a conventional tubular reactor consisting of a series of horizontally arranged small diameter tubes comprising about 16-30 in number, each tube being about 30-60 feet long and connected to succeeding tubes in series. Depending on specific reaction conditions; e.g., maximum temperatures, an average of 10-16 percent of the ethylene fed to the reactor is converted to polyethylene. Most of the non-converted ethylene; i.e., 84-90 percent, is reused by recycling the gas partly at an elevated pressure and partly at a low pressure.

Although either a gaseous oxygen catalyst system or a liquid catalyst system can be used to produce polyethylene in a tubular reactor, there are definite theoretical advantages in the efficient use of a liquid catalyst system. The use of a liquid catalyst system will permit the use of a lower maximum operating temperature, thereby increasing the density range of the polymer made in the tubes without decreasing the production rate of the particular reactor. Liquid catalyst systems will generally have a lower initiating temperature (130-160° C.) as compared to that of gaseous oxygen (180° C.). If a lower initiation temperature is used while maintaining the same maximum operating temperature, a greater portion of ethylene will be converted per pass to polyethylene.

The various types of tubular reactors and the processes used with these reactors to produce polyethylene with liquid catalyst systems have not provided satisfactory results in commercial practice. Many undesirable side effects have been caused by the use of liquid catalyst systems in the same methods as those ordinarily employed with gaseous oxygen. For example, liquid catalyst has been injected in the connecting line between the compressor and the reactor. This system has been unsatisfactory because excessive plugging and fouling of the reactor tubes occurred as a result of the formation of some very hard, high molecular weight polymer at very low temperatures. To overcome this low temperature polymer formation, it was proposed to inject the liquid catalyst into the system at a tempertture above the melting point of the polymer, thus preventing the tubes from being coated. Using this technique, catalyst, carried in a liquid medium, was injected by means of a plunger pump at different points in the reactor. However, this procedure proved impractical and unworkable because the catalyst injection was intermittent as a result of the stroke movement of the pump. The temperatures in the reactor tube immediately beyond the injection points surged upwards 10-20° C. after each injection of liquid catalyst. This surge indicated that the gas flowing through the reactor system was flowing in piston-like slugs, the one slug containing the major portion of catalyst and the following slug being relatively free of catalyst. As a result, the system contained alternately changing high temperature peaks. The alternate high temperature peaks resulted in a failure to obtain desirable high density polyethylene in any consistent fashion.

We have discovered a novel method for introducing liquid catalyst into a tubular reactor in a smooth and proportionate fashion, thereby providing for higher output of product and making it possible to obtain, if desired, products of consistently high density. In the copending application of Fred Denig and Hans Schappert, Ser. No. 839,129, filed Sept. 10, 1959, and now abandoned, there is described and claimed an ethylene polymerization process involving injecting ethylene and initiator into a tubular reactor at at least one additional point in the reactor downstream from the inlet of the reactor. The ethylene injected directly into the reactor serves as a cooling gas and facilitates reaction control. Our new method embodies the principle of cold gas injection in combination with a novel liquid catalyst injection system.

It is therefore an object of the present invention to provide a unique, efficient liquid catalyst-cold gas injection system for the high pressure polymerization of ethylene, the use of which permits greater product quality, control, and higher production rates. It is a further object to provide novel apparatus for carrying out the method of the invention.

In accordance with the invention, ethylene is polymerized in a tubular reactor at a maximum operating, or peak, temperature of 220-300° C. and an operating pressure of 16,000 to 50,000 p.s.i.g. in the presence of a catalytic amount of a free-radical generating liquid catalyst component. The fresh ethylene directed to the reactor is divided into a feed gas stream and a cold gas stream. The feed gas stream is introduced into the pre-heater section of the reactor, wherein the temperature of the gas stream is raised to a temperature at which polymerization can be initiated. The cold gas stream is subdivided into $N+1$ streams, wherein N is an integer having a value between 1 and 10. A liquid catalyst component is introduced into each of the N streams and distributed in the form of finely divided droplets to provide a substantially uniform dispersion of liquid catalyst in the cold ethylene gas. The N streams of catalyst-containing gas are separately introduced at spaced points along the length of the reactor at a temperature of 0-50° C. The amount of cold gas that is introduced at each of the successive points is increased by measured increments to provide a substantially uniform temperature drop at each successive point of introduction along the reactor. The total amount of cold gas in the N streams is regulated by introducing the catalyst-free stream of cold gas (the additional stream of the original $N+1$ streams) into the preheater section of the reactor and varying the amount of gas in this stream between 2 and 15 percent of the total amount of the cold gas stream. The relative proportion of cold gas in the N streams to the total amount of ethylene being introduced into the reactor is such as to provide euch each of the successive points of catalyst injection a minimum temperature greater than the melting point of the polymer at the operating pressure of the reactor.

As noted hereabove, the process of the invention is carried out in the conventional tubular reactor, which consists of a tube of great length and small cross-sectional area.

The reaction pressure, which ranges between 16,000 and 50,000 p.s.i.g., is predetermined, the choice of pressure being dictated to some extent by the density requirements of the polyethylene being produced. To provide the higher density polymers, higher pressures are required. Excellent results are obtained at pressures between 20,000 and 35,000 p.s.i.g. The upper limit of the reaction pressure is determined by the mechanical strength of the reactor and the compressor. The highest practical pressure is preferred, because higher conversions and improved product properties can be obtained at such pressures.

The rate of reaction is also measurably affected by the maximum operating, or peak, temperature. In the process of the invention excellent results are obtained in the range of 220–300° C., although higher conversions are obtained in the upper portion of the range. The temperature of the reaction also affects the properties of the polymer; the use of lower temperatures provides a produce of higher density. For this reason the temperature is predetermined within the above-indicated range, the temperature choice being dictated by the properties being desired in the final product.

The desired reaction temperature is maintained by the concentration of catalyst present during the polymerization, the exact amount of catalyst required to reach a given temperature varying with the change in pressure. At pressures in the range of 16,000 to 23,000 p.s.i.g., about 3–15 parts per million, based on the ethylene, of catalyst are used. When the pressures reach the 35,000 p.s.i.g. level, only 0.1–2.5 parts per million catalyst are required.

The method of this invention is based on the use of a liquid catalyst component as a primary catalyst. Useful liquid catalysts for purposes of the invention include any normally liquid organic free-radical generating catalyst or normally solid organic free-radical generating catalyst dissolved in a suitable substantially inert organic solvent. Particularly useful are peroxidic compounds, such as lauroyl peroxide, ditertiarybutyl peroxide, diisopropylperoxy dicarbonate, diethyl peroxide, dimethyl peroxide, tertiarybutyl hydroperoxide; azo catalysts, such as azobisisobutyronitrile; and oximes, such as acetoxime.

The liquid catalyst component is usually, but not necessarily, dissolved in a substantially inert organic liquid diluent to provide a suitable carrier for the catalyst. Aliphatic and aromatic hydrocarbons are preferred diluents. Benzene is an excellent medium for the catalyst in the production of consistently high quality polyethylene. Other useful diluents include hexane, cyclohexane, toluene, heptane, solvent naphtha, and the like. If an inert diluent is used as a carrier for the catalyst, the catalyst comprises from about 1–50 percent of the total solution.

Essentially, the novel process involves dividing the ethylene being introduced into the reactor into two main streams; a feed gas stream which is introduced into the pre-heater section of the reactor, and a cold gas stream which is subdivided as required, charged with dispersed droplets of liquid catalyst, and injected at selected points throughout the reactor.

Before it is introduced to the reactor, the ethylene is compressed in multistage compressors, which are conventional in the tubular reactor system. A typical commercial unit consists of two electrically driven compressor systems, a four- or six-stage low pressure compressor commonly called a "precompressor" and a one or two-stage high pressure compressor commonly called a "hypercompressor."

At the discharge of the hypercompressor, the ethylene is divided into the feed gas stream and the cold gas stream. Alternatively, the division of the streams can be made after the gas from the precompressor is joined with the high pressure recycle gas. In this embodiment the feed gas stream proceeds to the hypercompressor and a second hypercompressor is provided for the cold gas stream. In either embodiment the cold gas stream must be maintained at a pressure higher than that of the feed gas stream to provide for a positive flow of cold gas into the reactor.

The feed gas stream proceeds from the hypercompressor to the preheater section of the reactor, wherein the temperature of the stream is raised to a temperature at which polymerization can be initiated. The feed gas stream enters the preheater section at a temperature of about 80–100° C.; the temperature of the gas as it leaves the preheater section and enters the reactor is about 150–175° C. The feed gas contains no liquid catalyst component, although in one embodiment of the invention it may contain a catalytic amount of oxygen, which is used as an auxiliary or starting catalyst, as explained in detail hereafter.

The cold gas stream is subdivided into $N+1$ streams, wherein N is an integer having a value between 1 and 10 and represents the number of injection points in the reactor tubes that follow the preheating section. The number of injection points is determined by the relative proportion of cold gas to the total amount of ethylene being introduced to the reactor and the permissible temperature drop at each point of injection. The cold gas enters the reactor at a temperature between 0 and 50° C. A given volume of cold gas admixed with the hot gas in the reactor will cause an immediate temperature dip which is soon offset by the effect of the catalyst introduced along with the cold gas. The temperature drop must be controlled to prevent reaching a minimum temperature lower than the melting point of the polymer at the operating pressure of the reactor. If the temperature is allowed to drop below the melting point of the polymer, the reactor will become fouled with polymerized ethylene. Because of the sensible heat energy made available by raising the temperature of the cold gas once the reaction is initiated, the larger percentage of cold gas (as compared to total gas) will provide higher production rates. In order to achieve high production rates with only small temperature dips after injection, a greater number of injection points are required.

In order to obtain a high quality product of relatively uniform density, it is necessary to maintain a substantially uniform temperature drop after each point of cold gas injection. This concept is best understood by referring to FIGURE 1 of the drawings, which shows a temperature profile; i.e., the variation in temperature along the entire length of a 22-tube reactor. The curve of the drawing shows the maximum reactor tube temperature in degrees C. and the points of injection of catalyst-cold gas mixture for a reactor operating at a pressure of 23,000 p.s.i.g., producing a polymer having a melt index of 6–8 and a density of 0.920. The graph shows catalyst and cold gas injection at tubes 12, 14, 16 and 18 with a variation of about 10° C. from the average temperature drop, a variation that can be considered to be substantially uniform.

The temperature profile shown in the drawing is referred to as a "flat profile," since the peak operating temperature range of 240–254° C. is reached at tube 7 and continues at this temperature (except for the dips at the points of catalyst injection) for the remainder of the polymerization. The flat profile is obtained by using gaseous oxygen as an auxiliary catalyst to bring the reaction quickly up to the desired operating temperature. If, under the same conditions, only liquid catalyst is used for the reaction, a "rising profile" results, wherein the peak, or maximum, operating temperature is not obtained until the gas reaches the 16th–20th tubes. However, even in the case of the rising temperature profile, the dip caused by the introduction of the cold gas-catalyst mixture is kept substantially uniform by controlling the amount of cold gas introduced at a given injection point.

In order to maintain the substantially uniform temperature drop at each successive point of introduction of catalyst and cold gas along the reactor, it is necessary to provide an increased amount of cold gas at each successive point because of the greater amount of hot gas present at each successive point. The amount of cold gas to be added at each point is easily determined by a heat balance.

The amount of cold gas being introduced at the various points along the reactor can be regulated to provide the required substantially uniform temperature drop by varying the amount of gas in a spill-over stream directed to the preheater section of the reactor. Initially, the cold gas is divided into $N+1$ streams and catalyst is mixed with only N of these streams. The remaining stream is directed to the preheater and the amount of gas in this stream varies between 2 and 15 percent of the total amount of the total amount of the cold gas stream. The amount of gas being introduced at the various points of injection can be increased by decreasing the amount of gas in the spill-over stream. Thus, if it is required to increase the amount of gas at, for example, the first two injection points, the amount of gas required can be taken from the spill-over stream without affecting the amount being introduced at subsequent injection points.

The total amount of cold gas that can be injected depends upon the number of available injection points, the maximum operating temperature, the minimum operating temperature (the low point of the temperature dip) and the temperature of the cold gas. As we have noted hereabove, as the temperature dip (the difference between the maximum and minimum operating temperatures) at any given injection point is decreased, a greater number of injection points are required to handle a large volume of cold gas. The minimum temperature must never be permitted to drop below the melting point of the polymers at the operating pressure which, under ordinary conditions is about 140–170° C.

Each of the N substreams of the cold gas stream is charged with catalyst, either separately or prior to the subdivision, before introduction to the reactor. It is advantageous to separately introduce the liquid catalyst component into each of the N streams so that the amount of catalyst in each stream can be varied as desired.

The catalyst is introduced into each of the N streams using a novel feed means, which comprises an impervious conduit for ethylene gas, the impervious conduit having an inlet connected to the stream of cold ethylene from the hypercompressor and a restricted outlet connected to the tubular reactor. Near the inlet there is located an injection line for a liquid catalyst connected to a suitable pump. The apparatus has at least one perforate sparger located within the conduit, the sparger being positioned and arranged to cause the mixture of catalyst and ethylene gas to flow through the perforate portion of the sparger in a tortuous path and emerge as a substantially uniform dispersion of finely divided droplets of catalyst in the ethylene stream.

Figure 2:
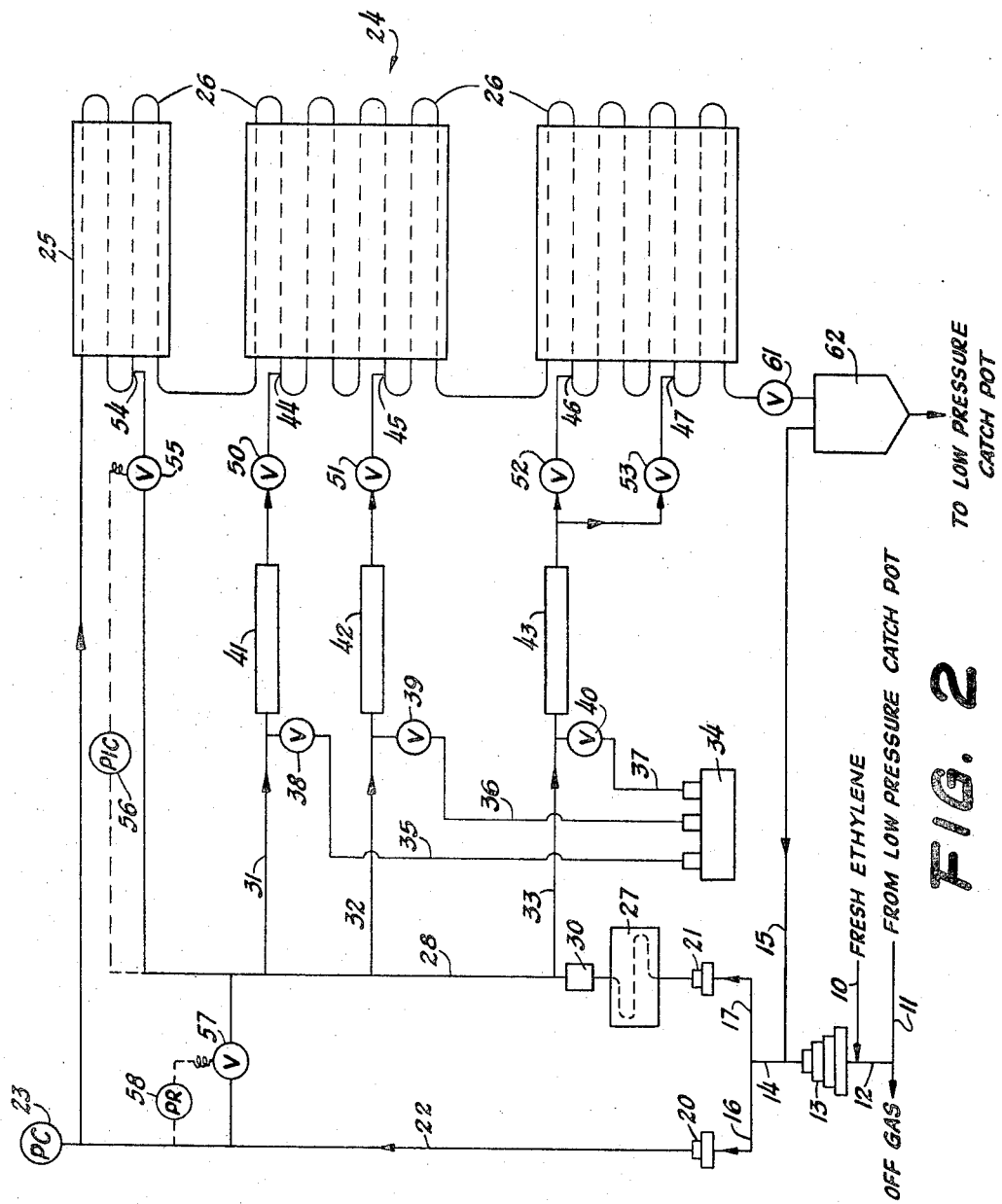

The process and apparatus of our invention is better understood when reference is made to FIGURES 2 and 3 of the accompanying drawings.

FIGURE 2 represents a schematic drawing of the overall process of the invention and FIGURE 3 illustrates a sparger mixer useful for introducing finely divided droplets of liquid catalyst component into a stream of cold ethylene gas.

Referring now to FIGURE 2, ethylene gas of desired purity enters line 10 from a source (not shown). The fresh ethylene is combined in line 12 with recycle gas in line 11 from the low pressure catch pot (not shown). The mixture of ethylene and low pressure recycle gas is compressed in precompressor 13 and travels through line 14, wherein it is admixed with recycle ethylene traveling through line 15 from the high pressure catch pot 62. The ethylene is then divided into the feed gas stream 16 and the cold gas stream 17. These two streams are further compressed in hypercompressors 20 and 21. The compressed feed gas stream passes through line 22 to the preheater section 25 of reactor 24. The pressure in line 22 is controlled by pressure controller 23. The cold gas stream leaving compressor 21 passes through cooler 27, wherein the temperature of the stream is regulated between about 0 and 50° C. Fresh catalyst and inert diluent carrier, if desired, are fed from suitable storage tanks (not shown) through liquid catalyst pump 34. The cold gas stream leaving cooler 27 passes through surge pot 30 into line 28, wherein it is subdivided into three streams 31, 32 and 33. The substreams are joined with liquid catalyst from streams 35, 36, and 37, the flow of catalyst being started by opening valves 38, 39 and 40. The cold gas, now containing liquid catalyst, passes through sparger mixers 41, 42 and 43 to provide a substantially uniform dispersion of finely divided droplets of liquid catalyst in the cold ethylene gas. The liquid catalyst component is injected into tubes 26 of the reactor 24 at injection points 44, 45, 46 and 47, the exact amount of catalyst and cold gas being introduced into the reactor being automatically controlled by valves 50, 51, 52 and 53. The remaining portion of the cold gas stream (not admixed with catalyst) proceeds to preheater section 25 of reactor 24, entering reactor tube 26 at point 54. The amount of gas in this stream, which is varied between 2 and 15 percent of the total cold gas stream, depending upon the requirements of the catalyst-containing streams, is controlled by valve 55 and pressure indicator controller 56. The relative pressures in feed gas stream 22 and cold gas stream 28 are maintained by means of valve 57 which is operated by pressure regulator 58. The polymerization of ethylene continues through reactor 24 and the mixture of ethylene gas and polymer are released through high pressure letdown valve 61 and the high pressure catch pot 62, where most of the unconverted gas is removed and directed back to the reactor through high pressure recycle line 15. The polymer and remaining unreacted ethylene are directed to the low pressure catch pot (not shown) and the recycle gas from this catch pot proceeds in part back to the reactor through line 11, the remainder being released as off gas.

FIGURE 2 illustrates one embodiment of the novel catalyst feed means of the invention. FIGURE 3 shows a sparger mixer comprising an impervious conduit 70 having an inlet 71 connected to a source of ethylene under high pressure (for example, line 33 of FIGURE 1). The liquid catalyst enters the impervious tube through line 73 of lens ring connection 74. The mixing device is provided with concentric pervious tubes, or spargers, 75 having multiple perforations 76 and closed downstream ends 77. The space between impervious conduit 70 and spargers 75 is obstructed by baffle plugs 78, which cause the mixture of ethylene and liquid catalyst to flow alternately from the impervious conduit through the spargers, resulting in a dispersion of liquid catalyst in ethylene in the form of finely divided droplets. The relatively uniform dispersion of liquid catalyst and ethylene leaves the mixers through restricted outlet, or orifice, 79 and proceeds to the tubular reactor.

Our invention is further illustrated by the following examples:

EXAMPLE I

Ethylene was polymerized at 23,000 p.s.i.g. in a tubular reactor substantially identical to that shown in FIGURE 2 having, as part of the apparatus, sparger mixers as shown in FIGURE 3. The reactor comprised 22 tubes, the inside diameter of which was 34 mm. A water jacket temperature of approximately 192° C. was measured at tube 14 and a water temperature of approximately 218° C. was measured at tube 22. A mixture of fresh ethylene and recycle ethylene from the high and low pressure recycle streams was split into a feed gas stream and a cold gas stream. The feed gas stream, containing no catalyst, was delivered to the preheater section of the reactor at a temperature of approximately 80° C. at the rate of 6000 lbs./hr. In the preheater section the temperature of the feed gas stream was raised to approximately 155° C. The cold gas stream (3000 lbs./hr.) was subdivided into six streams. The catalyst-free control, or spill-over stream (350 lbs./hr.), was introduced at tube number 2 in the preheater section of the reactor.

Liquid peroxidic catalysts were uniformly dispersed into the remaining five streams by means of sparger injectors as shown in FIGURE 3 of the drawings. A first catalyst, 0.52 lb./hr. of t-butylperacetate, as a three weight percent solution in benzene, was dispersed in the form of fine droplets in the two cold gas streams fed to tubes 11 and 13 at rates of 650 lbs./hr. and 600 lbs./hr., respectively. A second catalyst, 0.14 lb./hr. t-butylperbenzoate, as a 2.3 weight percent solution in benzene, was dispersed in the form of fine droplets in the cold gas stream fed to tube 15 at the rate of 600 lbs./hr. A mixture of catalysts, 0.02 lb./hr. t-butylperbenzoate, as a 2.3 weight percent solution in benzene, and 0.02 lb./hr. di-t-butyl-peroxide, as a 1.2 percent solution in benzene, was dispersed in the form of fine droplets in the cold gas streams fed to tubes 17 and 19 at a rate of 400 lbs./hr. The total catalyst added to the reactor at all of the injection points corresponded to five parts per million, based on the ethylene.

The temperature in the reactor (as indicated by the temperature profile) rose steadily and reached a peak, or maximum, operating temperature of 260–265° C. at tube 17, although the temperature drop was substantially uniform at the various points of catalyst injection.

The run was continued for 49 hours and product was obtained at the rate of 1050 lbs./hr. The product polymer had a density of 0.924 g./cc. and a melt index of 7.0. The physical properties of the polymer showed it to be an excellent paper coating resin.

EXAMPLE II

For purposes of comparison a controlled polymerization of ethylene was conducted in the apparatus shown and described in the copending application of Fred Denig and Hans Schappert, Ser. No. 839,129. Ethylene at a pressure of approximately 22,000 p.s.i.g. and containing 35 parts per million catalyst was fed to the reactor at a rate of 5000 lbs./hr. The water circulating in the jacket surrounding the first four tubes heated the oxygen-containing ethylene to a temperature sufficient to initiate the polymerization. Thereafter, polymerization was self-sustaining and the reaction temperature continued to rise until a temperature of 240° C. was reached at the end of tube 7. Ethylene at ambient temperatures at a pressure slightly in excess of 22,000 p.s.i.g. was continuously introduced into the end of tube 7 at the rate of 800 lbs./hr., resulting in an immediate temperature drop to 220° C. The temperature rose gradually to about 240° C. in subsequent reactor tubes. A polymeric product was obtained from the reaction at the rate of about 800 lbs./hr. The polymer had a density of 0.918 g./cc.

A comparison of the results of Example I and II demonstrates the considerable improvement afforded by the method of the invention. In spite of the fact that the use of lower reaction temperatures ordinarily provides a product of higher density, the method of Example I wherein the peak temperature was 265° C. provided a product having a density of 0.924 g./cc. in contrast with the 0.918 g./cc. density polymer produced at 240° C. by the method of Example II. Both processes were conducted in a 22-tube reactor at a pressure 23,000 p.s.i.g. The product recovery rate of the process of Example I was 1050 lbs./hr., which was considerably higher than the 800 lbs./hr. obtained by the process of comparative Example II.

EXAMPLE III

Ethylene was polymerized at 23,000 p.s.i.g. in the apparatus as described in Example I. A water jacket temperature of approximately 216° C. was measured at tubes 14 and 22. A mixture of fresh ethylene and recycle ethylene from the high and low pressure recycle streams was split into a feed gas stream and a cold gas stream. Twenty parts per million oxygen, based on the ethylene, was introduced into the feed gas stream and delivered to the preheater section of the reactor at a temperature of approximately 80° C. at the rate of 6000 lbs./hr. In the preheater section the temperature of the feed gas stream was raised to approximately 240° C. The cold gas stream (3000 lbs./hr.) was sub-divided into five streams. The catalyst-free control, or spill-over stream, (200 lbs./hr.) was introduced at tube 2 in the pre-heater section of the reactor. A liquid peroxidic catalyst, t-butylperbenzoate, was uniformly dispersed into the remaining four streams by means of sparger injectors as shown in FIGURE 3. The first increment of catalyst, 0.03 lb./hr., as a 0.52 weight percent solution in benzene, was dispersed in the form of fine droplets in the cold gas stream fed to tube 13 at the rate of 500 lbs./hr. A second increment, 0.03 lb./hr., as a 0.5 weight percent solution in benzene, was dispersed in the form of fine droplets in the cold gas stream fed to tube 15 at the rate of 700 lbs./hr. The third increment of catalyst, 0.09 lb./hr., as a 0.6 weight percent solution in benzene, was dispersed in the form of fine droplets in the cold gas stream fed to tubes 17 and 19 at a rate of 800 lbs./hr. The total peroxidic catalyst added to the reactor at all of the injection points correspond to 8 parts per million, based on the ethylene.

The temperature in the reactor followed a profile similar to that shown in FIGURE 1 of the drawings. The average maximum operating temperature of 235–240° C. was reached at tubes 15, 17, 19 and 20. This temperature drop after each point of catalyst injection was substantially uniform, the average drop being about 15° C. This run illustrates the so-called "flat" temperature profile in contrast with the "rising" profile of Example I.

The run was continued for 52 hours and product was obtained at the rate of 920 lbs./hr. The product polymer had a density of 0.923 g./cc. and a melt index of 6.0. Film evaluation tests of 11 samples showed optical properties of 3–4 "see through" with haze values of 11–14, indicating the polymer to be a good film-grade resin.

The good optical properties of the polymer can be attributed to the "flat" temperature profile wherein most of the polymerization was conducted at substantially the same temperature. The rapid rise in the pre-heater section of the reactor is accomplished using oxygen as an auxiliary catalyst.

While the foregoing example shows the use of 20 parts per million oxygen, based on the ethylene, this amount could be conveniently varied between 15 and 50 parts per million at pressures of 16,000 to 23,000 p.s.i.g. and 0.5–2.5 parts per million at pressures of 35,000 to 50,000 p.s.i.g.

Examples I and III show, after division of the streams, a feed gas stream/cold gas stream weight ratio of 2:1. This ratio can vary from about 9:1 to 1:5, depending on the peak reaction temperature, the cold gas temperature, the maximum permissible temperature drop after injection and the number of available injection points.

We claim:

1. In the polymerization of ethylene in a tubular reactor at maximum operating temperatures of 220–300° C. and pressures of 16,000–50,000 p.s.i.g. in the presence of a catalytic amount of a free radical generating liquid catalyst component, the improvement comprising dividing the ethylene being introduced into the reactor into a feed gas stream and a cold gas stream, introducing the feed gas stream into the preheater section of said reactor wherein the temperature of the feed gas is raised to a temperature of at least 150° C., subdividing the cold gas stream into $N+1$ streams, wherein N is an integer having a value between one and ten, introducing finely divided droplets of liquid catalyst component into each of the N streams, with the remaining 1 stream being catalyst free, by passing a mixture of liquid catalyst component and ethylene through a restricted tortuous path to provide a uniform dispersion of liquid catalyst component in cold ethylene gas, separately introducing at successive spaced points along the length of the reactor said N streams at a temperature of 0–50° C., the amount of cold gas being introduced at each of said successive points being increased by measured increments to provide a substantially uniform temperature drop at each successive point of introduction along the reactor, and regulating the total amount of cold gas in said N streams by introducing the catalyst-free stream of cold gas into the preheater section of the reactor and varying the amount of gas in said catalyst-free stream between 2–15 percent of the total amount of said cold gas stream, the relative proportion of cold gas in said N streams to the total amount of ethylene being introduced into the reactor being such as to provide at each of said successive points of catalyst injection a minimum temperature greater than 140–170° C.

2. Method according to claim 1 wherein gaseous oxygen is introduced in the feed stream as an auxiliary catalyst to provide a reaction characterized by a flat temperature profile.

3. In the polymerization of ethylene in a tubular reactor at maximum temperatures of 220–300° C. and pressures of 16,000–50,000 p.s.i.g. in the presence of 0.1–15 p.p.m., based on the ethylene, of a free radical generating liquid catalyst component, the improvement comprising dividing the ethylene being introduced into the reactor into a feed gas stream and a cold gas stream, the weight ratio of feed gas/cold gas stream being between 9:1 and 1:5, introducing the feed gas stream into the preheater section of said reactor wherein the temperature of the feed gas is raised to a temperature at which polymerization can be initiated, subdividing the cold gas stream into $N+1$ streams, wherein N is an integer having a value between one and ten, introducing liquid catalyst component into each of the N streams with the remaining 1 stream being catalyst free, passing the streams of cold ethylene gas containing liquid catalyst through a restricted tortuous path to provide a uniform dispersion of finely divided droplets of liquid catalyst component in said cold ethylene gas, separately introducing at successive spaced points along the length of the reactor said N streams at a temperature of 0–50° C., the amount of cold gas being introduced at each of said successive points being such as to provide a substantially uniform temperature drop at each successive point of introduction along the reactor, and regulating the total amount of cold gas in said N streams by introducing the catalyst-free stream of cold gas into the preheater section of the reactor and varying the amount of gas in said catalyst-free stream between 2–15 percent of the total amount of said cold gas stream, the relative proportion of cold gas in said N streams to the total amount of ethylene being introduced into the reactor being such as to provide at each of said successive points of catalyst injection a minimum temperature greater than the melting point of the polymer at the operating pressure of the reactor.

4. In combination with a tubular reactor for the polymerization of ethylene at pressure of 16,000–50,000 p.s.i.g., a feed means for a liquid catalyst component comprising an impervious conduit for ethylene gas, said impervious conduit having an inlet connected to a source of ethylene under high pressure and a restricted outlet connected to said tubular reactor, injection means for a liquid catalyst located near said inlet, at least one perforate sparger located within said conduit, said sparger being positioned and arranged to cause the mixture of catalyst and ethylene gas to flow through the perforate portion of the sparger in a tortuous path.

5. In combination with a tubular reactor for the polymerization of ethylene at pressure of 16,000–50,000 p.s.i.g., a feed means for a liquid catalyst component comprising an impervious conduit for ethylene gas, said impervious conduit having an inlet connected to a source of ethylene under high pressure and a restricted outlet connected to said tubular reactor, injection means for a liquid catalyst located near said inlet, two perforate spargers located successively within said conduit, said spargers being positioned and arranged to cause the mixture of catalyst and ethylene gas to flow in a tortuous path successively through said impervious conduit, the first of said spargers, the space between said spargers and the wall of said impervious conduit, the second of said spargers and said impervious conduit.

6. In combination with a tubular reactor for the polymerization of ethylene at pressures of 16,000–50,000 p.s.i.g., a feed means for a liquid catalyst component comprising an impervious conduit for ethylene gas, said impervious conduit having an inlet connected to a source of ethylene under high pressure and a restricted outlet connected to said tubular reactor, injection means for a liquid catalyst located near said inlet, a plurality of concentric pervious conduits having closed downstream ends located successively within said impervious conduit, a plurality of baffle plugs obstructing the space between said impervious conduit and said pervious conduits causing the mixture of catalyst and ethylene gas to flow alternately from said impervious conduit through said pervious conduits.

7. In combination with a tubular reactor for the polymerization of ethylene at pressures of 16,000–50,000 p.s.i.g., a feed means for a liquid catalyst component comprising an impervious conduit for ethylene gas, said impervious conduit having an inlet connected to a source of ethylene under high pressure and an outlet orifice connected to said tubular reactor, injection means for a liquid catalyst located near said inlet, two concentric pervious conduits having closed downstream ends located successively within said impervious conduit, a plurality of baffle plugs obstructing the space between said impervious and said pervious conduits causing the mixture of catalyst and ethylene gas to flow alternately from said impervious conduit to said pervious conduits.

References Cited

FOREIGN PATENTS 915,240  1/1963  Great Britain.
70,018  11/1959  India.

JOSEPH L. SCHOFER, *Primary Examiner.*

F. L. DENSON, L. EDELMAN, *Assistant Examiners.*